R. OTERS.
CUTWORM PREVENTER.
APPLICATION FILED JUNE 8, 1912.
1,060,116.
Patented Apr. 29, 1913.
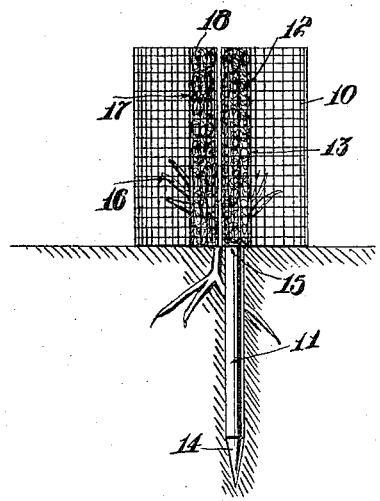
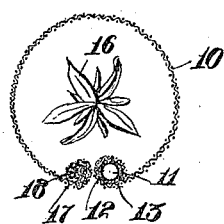
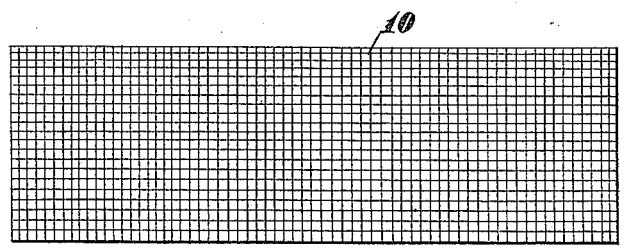
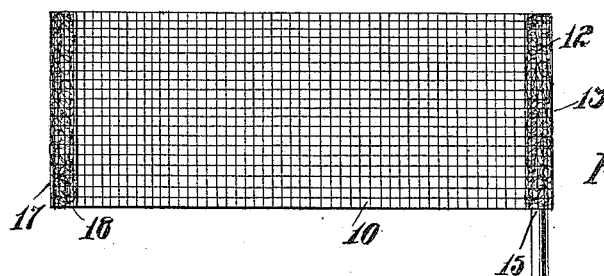
Inventor
R. Oters,

UNITED STATES PATENT OFFICE.

RICHARD OTERS, OF PELHAM MANOR, NEW YORK.

CUTWORM-PREVENTER.

1,060,116.   Specification of Letters Patent.   Patented Apr. 29, 1913.

Application filed June 8, 1912. Serial No. 702,485.

*To all whom it may concern:*

Be it known that I, RICHARD OTERS, a citizen of the United States, residing at Pelham Manor, in the county of Westchester, State of New York, have invented certain new and useful Improvements in Cutworm-Preventers; and I do hereby declare the following to be a full, clear, and exact description of the invention, such as will enable others skilled in the art to which it appertains to make and use the same.

This invention relates to a cut worm preventer, or an improved device adapted to be engaged over a plant to protect and shield the same from the cut worm.

The primary object of this invention is to provide an improved and simple form of protector of the class described especially adapted for use in connection with cabbage, cauliflower and Brussels sprouts which are usually subject to the attacks of the cut worm in their early stages of growth.

With the above and other objects in view, the invention consists of certain other combinations and arrangements of parts as will be hereinafter more fully described, claimed and illustrated in the accompanying drawings, in which:

Figure 1 is a side elevation of my improved protector or cut worm preventer as in use. Fig. 2 is a top plan view thereof. Fig. 3 is a face view of the protector opened out with the parts in the position before the odoriferous filling is placed therein. Fig. 4 is a similar view but showing the ends of the fabric wire having the supporting stick and filling secured in position.

As shown, my improved cut worm preventer or protector consists of a rectangular section or strip of wire or woven fabric 10 of suitable mesh so as to thoroughly shield the young plant from the worm, the same being normally in a flat condition and adapted to be coiled with the extremities thereof in abutting positions to completely encircle the plants. With this purpose in view, a supporting stick 11 is provided, the same at its upper end being adapted to receive filling of fiber indicated by the numeral 12 therearound, said fiber being saturated with tar and camphor to produce an efficient odoriferous element to ward off the cut worms or cabbage maggots, after which the adjacent end portions of the wire fabric 10 is coiled around the filling and supporting member as shown at 13 so as to be securely held in position.

When the fabric is thus secured around the filling and supporting member or stick, the lower portion of the supporting member which is tapered as shown at 14 to provide a point for easily penetrating the ground or soil, will project therefrom as shown at 15 so as to securely hold the protector around the plant indicated by the numeral 16. The opposite end or vertical edge portion of the wire fabric is also turned or rebent as shown at 17 to inclose a similar odoriferous filling indicated by the numeral 18, after which the fabric is rolled or coiled in the manner shown in Figs. 1 and 2 of the drawings so that the ends of the fabric or circular protector thus produced will be disposed in engagement to prevent the entrance of destroying pests which is further assisted by the engagement or penetration of the lower edge portions of the protector or fabric in the soil while the odoriferous filling serves the usual purposes of warding off the cut worm without in any manner injuring the plant.

From the foregoing description, in connection with the accompanying drawings, it will be apparent that a cut worm preventer or protector is provided which can be very economically produced for serving the purpose of protecting the young growing plants of the type hereinbefore specified, it being also apparent that the same may be provided to fit various other plants and it is further evident that the device is only necessary for use in the early stages of the life of the plant, as the device can be made extremely small or as large as desired so as to be sufficiently spaced from the plants to prevent injury to the growth of the plants. The device can also be used a number of times in preventing the entrance of the insects through the protector to destroy the plants and is provided with a coating of paint to prolong the life thereof.

I claim:

1. In a cut worm preventer, a section of material having its ends rebent to inclose separate odoriferous fillings, said section being bent so that the said ends will resiliently abut each other and a supporting member for said section.

2. A plant protector of the class described comprising a section of wire fabric, a supporting member, said fabric having its end portions coiled upon themselves, one end inclosing the supporting member to provide a projecting portion adapted to penetrate the ground surface and a fiber filling within the coiled portions and saturated with an insect repelling substance, one of said fillings being disposed around the supporting member.

In testimony whereof, I affix my signature, in presence of two witnesses.

RICHARD OTERS.

Witnesses:
CHARLES KAMMENMEYER,
A. H. COLE.

Copies of this patent may be obtained for five cents each, by addressing the "Commissioner of Patents, Washington, D. C."